O. GRAUHEDING.
TELESCOPE GUN SIGHT.
APPLICATION FILED JUNE 1, 1911.

1,004,416.

Patented Sept. 26, 1911.

UNITED STATES PATENT OFFICE.

OSCAR GRAUHEDING, OF DUSSELDORF, GERMANY, ASSIGNOR TO RHEINISCHE METALL-
WAAREN- UND MASCHINENFABRIK, OF DUSSELDORF-DERENDORF, GERMANY, A
CORPORATION OF GERMANY.

TELESCOPE GUN-SIGHT.

1,004,416.

Specification of Letters Patent. Patented Sept. 26, 1911.

Application filed June 1, 1911. Serial No. 630,643.

*To all whom it may concern:*

Be it known that I, OSCAR GRAUHEDING, engineer, a subject of the German Emperor, residing at 27 Fischerstrasse, Dusseldorf, Germany, have invented certain new and useful Improvements in Telescope Gun-Sights; and I do hereby declare the following to be a full, clear, and exact description of the invention, such as will enable others skilled in the art to which it appertains to make and use the same.

It has been previously proposed to adjust the sighting point in telescope gun sights by means of the intersection of two lines or curves, which can be relatively displaced.

The present invention relates to an arrangement of such telescope sights, in which the sighting point is determined by the intersection of a vertical line on a fixed plate with a curve marked on a second plate, which is capable of rotation about an axis eccentric to the optic axis of the telescope. The rotating plate has on its circumference a scale of gun ranges and the eccentric disposition of this plate enables only a small portion of the curve to come into the field of view at any time, which portion corresponds to the given range. The eccentric disposition of the plate also allows its diameter to be greater than that of the eye piece, without the scale being out of the field of view. This allows of a much more open scale, since if the system is concentric the diameter of the scale must be smaller than the eyepiece to permit all parts of the scale to be in the field of view. Also with the concentric arrangement it is not possible to make use of points of intersection spread all over the field of view, but only those which according to the position of the curve lie either in the upper or lower half of the field, so that only half the latter can be utilized for the required changes in the sighting point. The present arrangement on the other hand utilizes the whole field for this purpose.

The invention will be hereinafter fully set forth and particularly pointed out in the claims.

The accompanying drawings illustrate by way of example a construction according to the invention in which—

Figure 1:
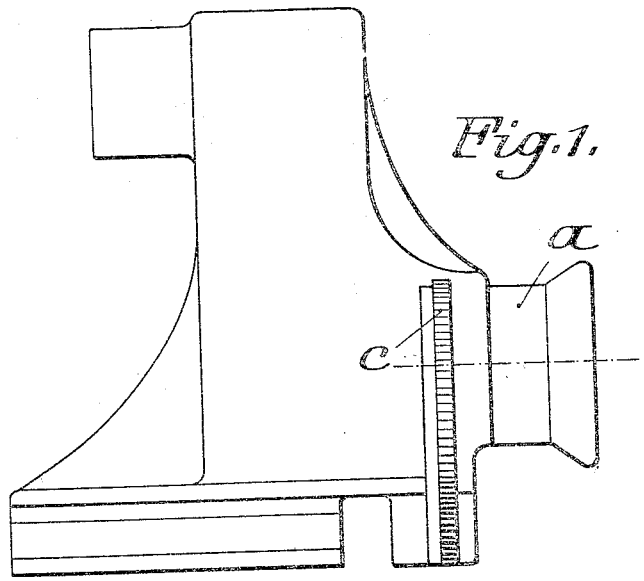
Figure 2:
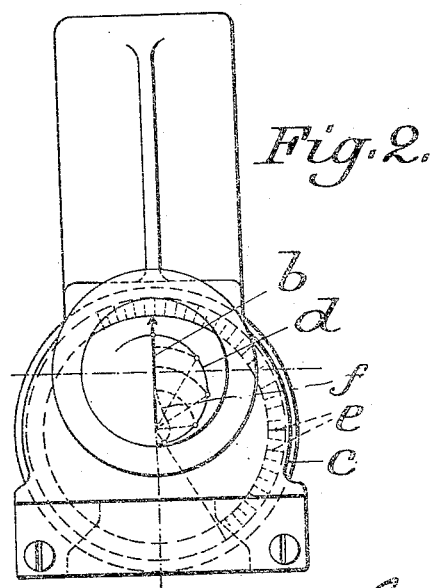

Figure 1 is a side elevation and Fig. 2 an end elevation of the eye piece of a telescope fitted with the fixed and movable plates.

In the eye piece $a$ is the fixed glass plate which carries the vertical line $b$ and also the second circular glass plate $c$, whose axis of rotation is eccentric to the optic axis of the telescope. The curve $d$ is marked on the second plate and forms an intersecting point with the vertical line. The curve is so constructed, that the point of intersection corresponds to the elevation of the gun, when the plate is adjusted to the given range marked on its circumference. The points of intersection are consequently sighting points. The range is read on a scale $e$ marked on the circumference of the rotatable glass plate and the portion of the scale in use at any time comes into the field of view and is set by the vertical line $b$. The curve $d$ is constructed so that equal divisions correspond to unequal vertical displacements. The drift due to the rifling of the gun can be compensated by replacing the vertical line by a curve $f$ as shown dotted in Fig. 2. Since the elevation required for a given range varies with different types of guns several scales can be provided for this purpose. The edge of the plate is external to the telescope for the greater part of the circumference and is milled for convenience of rotation.

I claim—

1. A telescope gun sight wherein the sighting point is determined by the intersection of a vertical line with a curved line, comprising a fixed plate and an adjustable plate, the vertical line being on one plate and the curved line on the other, said adjustable plate being capable of being turned on an axis eccentric to the optic axis of the other plate.

2. A telescope gun sight wherein the sighting point is determined by the intersection of a vertical line with a curved line, comprising a fixed plate having a vertical line, and an adjustable plate having a curved line, said adjustable plate being capable of being turned about an axis eccentric to the optic axis of the fixed plate.

3. A telescope gun sight wherein the sighting point is determined by the intersection of a vertical line with a curved line, comprising a fixed plate having a vertical line, and an adjustable plate having a curved line, said adjustable plate also having a scale with divisions corresponding to the range visible in the field of view, and capable of coinciding with the vertical line on the fixed plate.

4. In a telescope gun sight wherein the sighting point is determined by the intersection of a vertical line with a curved line, comprising a fixed plate having a vertical line, and an adjustable plate having a curved line equal divisions of which correspond to unequal vertical displacements.

5. A telescope gun sight wherein the sighting point is determined by the intersection of a vertical line with a curved line, comprising a plate having a vertical line, and a second plate having a curved line, one of said plates having a range scale, and the position of one plate being capable of being adjusted relatively to the other so that only portions of the range scale which correspond to the range set appear in the field of view.

In testimony whereof, I have signed this specification in the presence of two subscribing witnesses.

OSCAR GRAUHEDING. [L. S.]

Witnesses:
ALFRED HENKEL,
ALBERT F. NUFER.